UNITED STATES PATENT OFFICE.

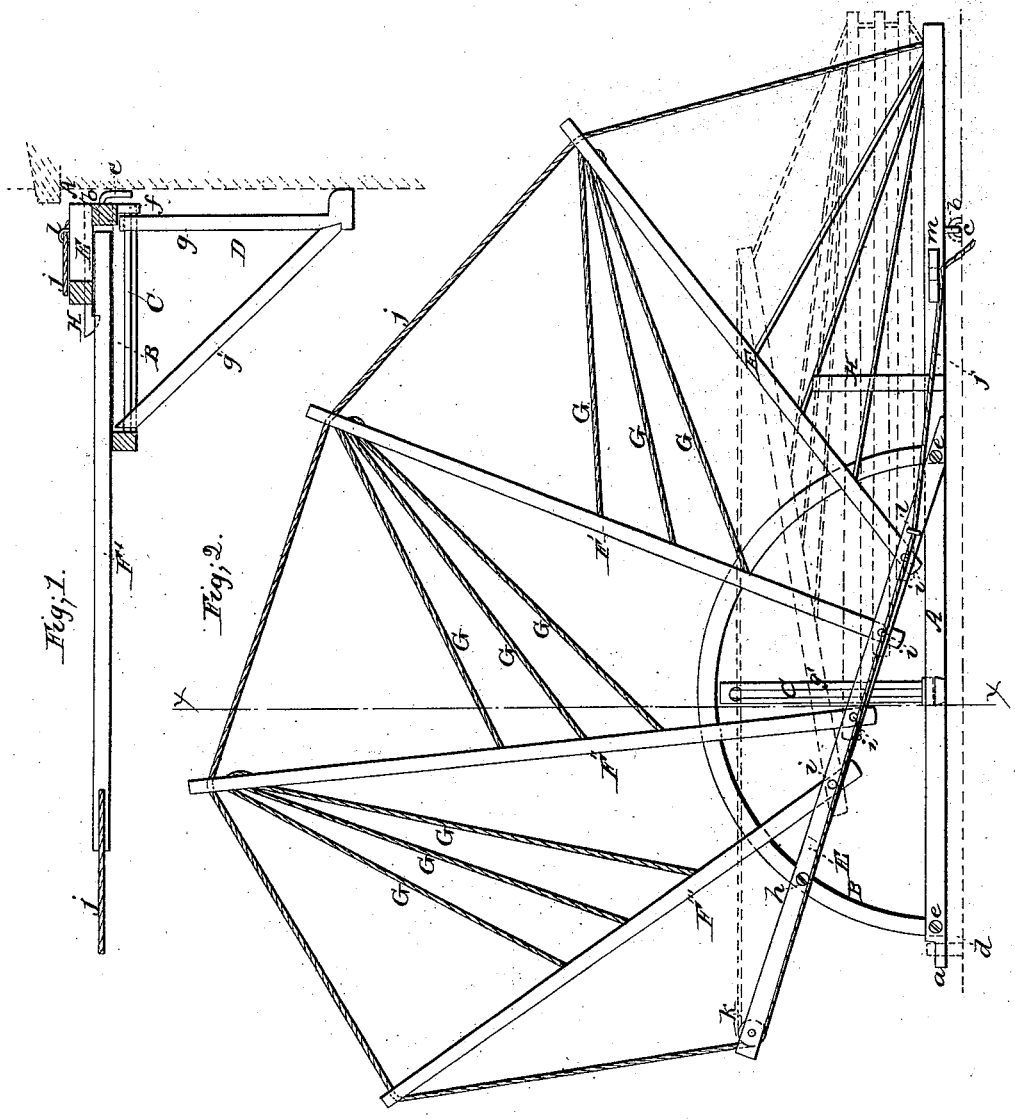

M. C. BURR, OF OWATONNA, MINNESOTA.

IMPROVED CLOTHES-DRIER.

Specification forming part of Letters Patent No. 36,204, dated August 19, 1862.

*To all whom it may concern:*

Be it known that I, M. C. BURR, of Owatonna, in the county of Steele and State of Minnesota, have invented a new and Improved Clothes-Drying Device, the same being more especially designed to be attached to the windows of dwellings; and I do hereby declare that the following is a full, clear, and exact description of the same, reference being had to the accompanying drawings, making a part of this specification, in which—

Figure 1 is a vertical section of my invention, taken in the line $x\ x$, Fig. 2. Fig. 2 is a plan or top view of the same.

Similar letters of reference indicate corresponding parts in the two figures.

The object of this invention is to obtain a simple device which may be readily applied to the windows of dwellings and admit of the clothes being placed on it and removed therefrom with the greatest facility, and when not in use be capable of being compactly folded, so that it may be stowed away in a small space.

To enable those skilled in the art to fully understand and construct my invention, I will proceed to describe it.

A is a bar of wood, of any suitable length, which has a tenon, $a$, at one end of it, and a hook, $b$, attached to it at a suitable distance from the tenon, to fit in a staple, $c$, in the building just below the window, the tenon $a$ fitting in a socket, $d$, also attached to the building.

B is a semicircular bar, of wood or metal, which is attached to the under side of A by bolts $e$, and C is a rod, one end of which is attached to A or a pendant, $f$, thereof, and the opposite end attached to the bar B at its center. D is a brace, which is formed of an upright bar, $g$, and an oblique bar, $g'$, said bars being connected at their lower ends and having their upper ends fitted loosely on the rod C. This brace, when the device is applied to the building, serves to support it as it bears against the building, as shown clearly in Fig. 1, the upper end of the oblique bar $g'$ being near the semicircular bar B.

E is a bar, which may be of wood, and has one end framed into the bar A, so as to have an oblique position with the latter, forming an angle of about seventeen degrees therewith, and secured to the semicircular bar B by a pin, $h$.

F F' F'' F''' are four arms, which are secured at their inner ends to the bar E by pins $i$. These arms are allowed to turn freely on the pins $i$, and they rest on the semicircular bar B. They may be about six feet in length, and are connected at their outer ends by a rope or cord, $j$, which is fastened to each arm at such points as to admit of the arms expanding or spreading at suitable and equal distances apart. This cord passes around a pulley, $k$, in the outer part of the bar E, and passes through a guide, $l$, on said bar, and is attached to or wound around a pin, $m$, thereon, as shown in Fig. 2.

G represents cords or ropes, which are attached to the arms, as shown in Fig. 2, or in any suitable way, to receive the clothes to be dried; and H is a catch, which is attached to the bar A and projects out at right angles therefrom. The form of the catch is clearly shown in Fig. 1.

The operation is as follows: The bar A is attached to the building and the brace D allowed to drop in a vertical position to support the device. The bar F is then drawn out or adjusted by pulling the rope or cord $j$ a suitable distance from the building, so that the cords or ropes G, which are attached to it, may be filled with clothes. The succeeding arm, F', is then drawn out and its cords filled, and so on until all the arms are spread out, as shown in Fig. 2, and the cords or ropes G fully covered with clothes. The arms are then retained in an expanded state by fastening the cord or rope $j$ to the pin $m$.

When the device is not required for use, the arms are folded together and held in contact parallel with each other and the bar A by the catch H, the bar A detached from the building, and the brace D folded up underneath B. The whole concern may then be stowed away and monopolize but little room.

The clothes, it will be understood, are removed from the cords or ropes G by drawing in the arms compactly toward A.

This device may be applied to a fence or any outdoor fixture, when desired, equally as well as to a building.

Having thus described my invention, what I claim as new, and desire to secure by Letters Patent, is—

The straight bars A E, in connection with the semicircular bar B, brace D, and the arms F F' F'' F''', connected by cords or ropes $j$ G, combined and arranged to operate as and for the purpose set forth.

M. C. BURR.

Witnesses:
R. C. AMBLER,
M. A. DAILEY.